No. 780,011. PATENTED JAN. 10, 1905.
C. A. NEWBERRY.
ANIMAL DIPPING MACHINE.
APPLICATION FILED MAY 31, 1904.
2 SHEETS—SHEET 1.
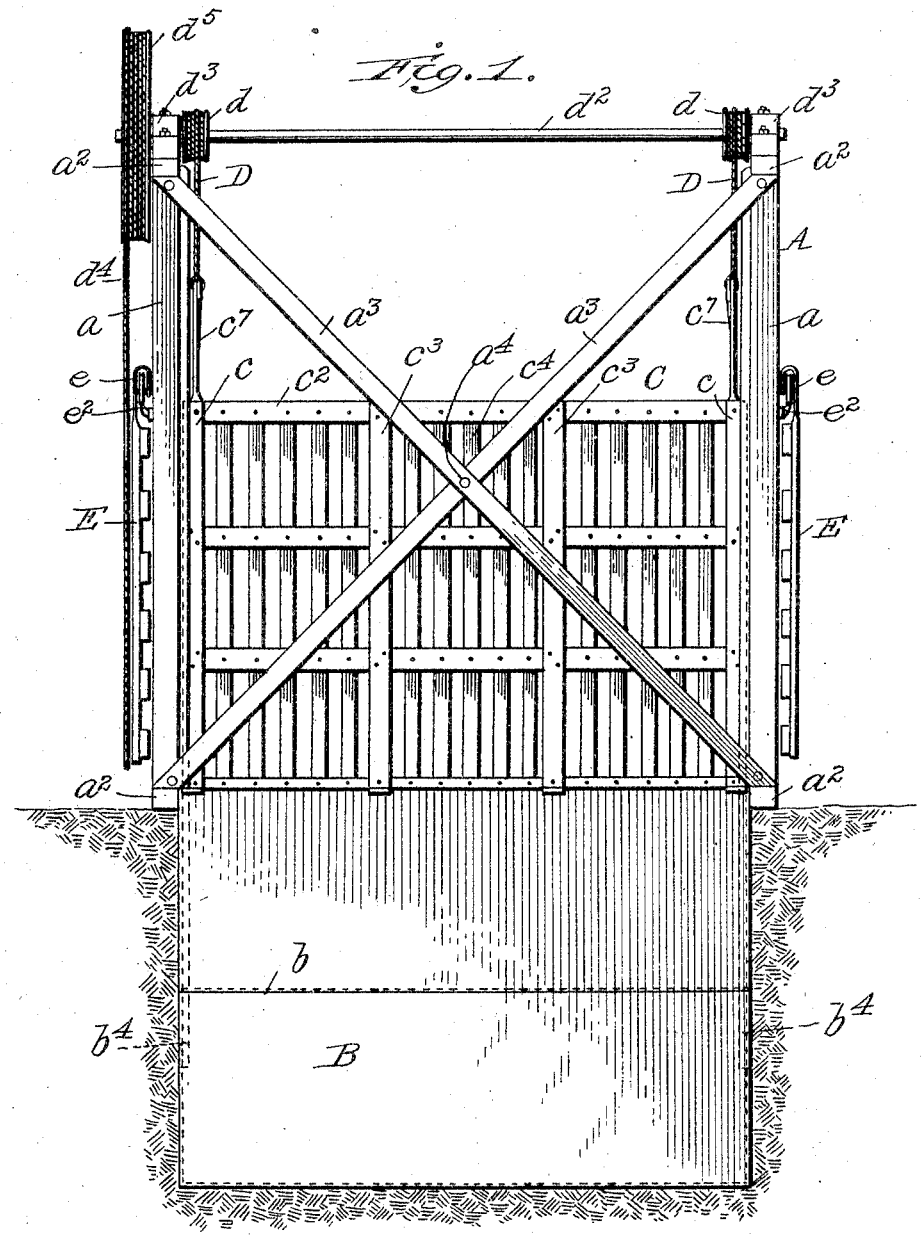

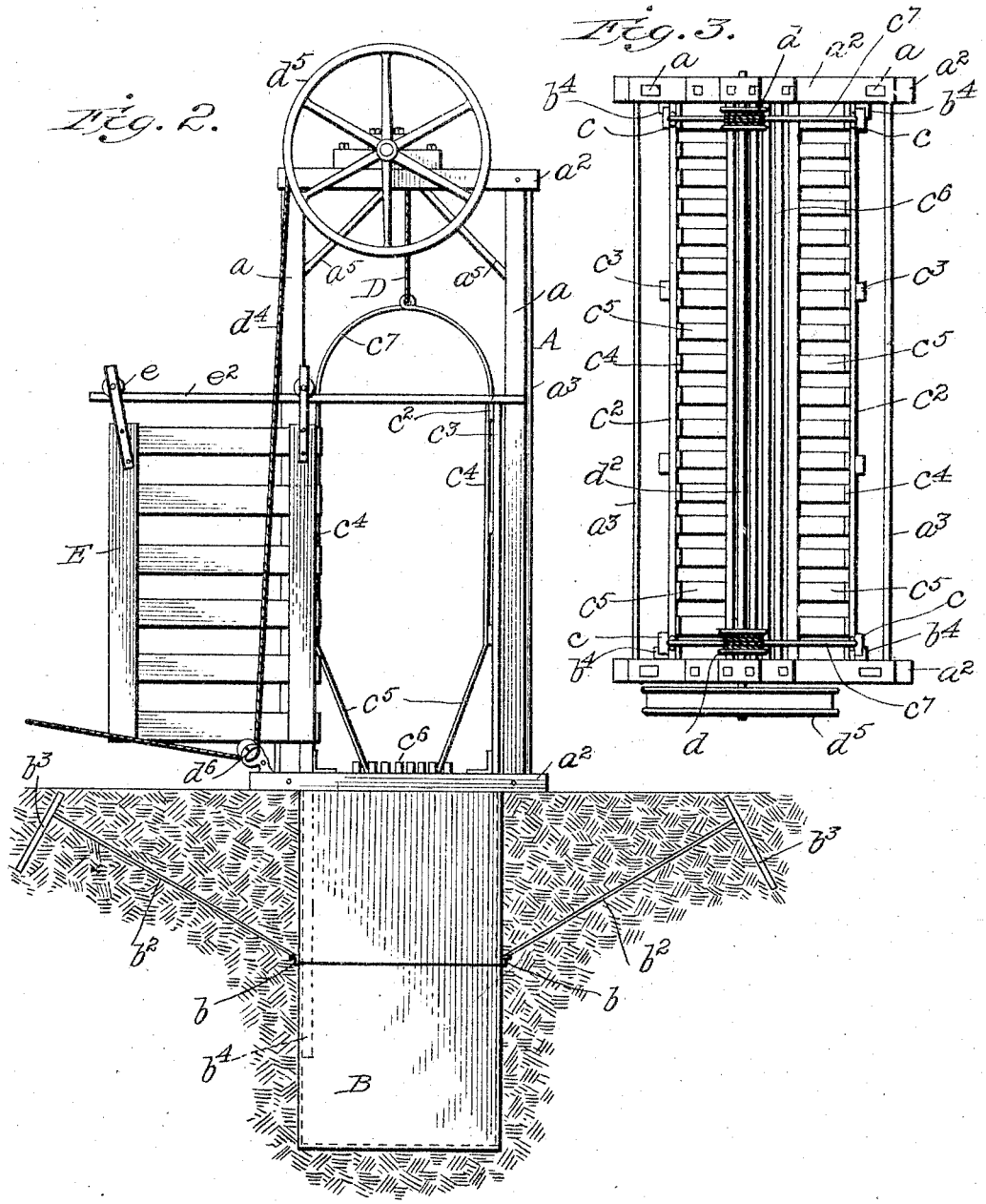

No. 780,011.                                        Patented January 10, 1905.

UNITED STATES PATENT OFFICE.

CHENIA A. NEWBERRY, OF ALLIANCE, NEBRASKA.

ANIMAL-DIPPING MACHINE.

SPECIFICATION forming part of Letters Patent No. 780,011, dated January 10, 1905.

Application filed May 31, 1904. Serial No. 210,490.

*To all whom it may concern:*

Be it known that I, CHENIA A. NEWBERRY, a citizen of the United States, residing at Alliance, in the county of Boxbutte and State of Nebraska, have invented a new and useful Animal-Dipping Machine, of which the following is a specification.

My invention relates to the care of animals, and particularly to their treatment for the purpose of preventing or curing various diseases—such as mange, itch, &c.—to which they are subject, for destroying lice and other parasites, and for promoting generally the health and cleanliness of the animal. The parts of which such machines are composed are a cage in which the animal is to be confined to be dipped, the frame in which the cage is suspended, the hoisting means upon the frame for raising and lowering the cage, and the tank to contain the liquid.

The object of the invention is to produce a machine of this general character for dipping animals into a suitable liquid preparation, which machine shall be compact in form, durable in construction, and efficient in use; and the invention consists, therefore, in the novel construction and arrangement of parts, hereinafter described, and shown in the accompanying drawings, in which—

Figure 1 is a view in side elevation of my improved machine. Fig. 2 is an end view of the same, the gate being shown open; and Fig. 3 is a plan view of the machine.

Referring to the drawings, A indicates the frame of the machine, which consists of four uprights or corner-posts $a$, the two at each end being connected at the top and bottom by cross-strips $a^2$. The posts $a$ are also connected by side braces $a^3$, which connect the top of a post $a$ at one end with the bottom of the opposite post at the other end, thus crossing diagonally and being fastened at the point of intersection, at $a^4$, by a bolt or rivet or by any other suitable means. Angle-braces $a^5$ are also provided to connect the posts $a$ with the upper cross-strips $a^2$, as shown in Fig. 2.

The tank B is designed to contain the dipping solution and is constructed of galvanized sheet-steel thoroughly riveted and soldered at all joints and reinforced at the angles, as shown by dotted lines in Figs. 1 and 2. Side braces are also provided on the outside of the tank, midway between the bottom and top, as shown at $b$, and to these side braces are attached stay means $b^2$ in the form of anchor-wires, the free ends of which are made fast to posts $b^3$, driven into the ground a short distance from the tank. These stay means may be attached to the side braces $b$ at a point midway between the ends of the tank and when drawn tight after the tank has been set prevent the sagging or bulging inward of the tank sides under the earth-pressure. The upper edge of the tank is attached in any suitable manner to the frame A and at the corners angle-irons $b^4$ are fastened to the corner-posts $a$ and extend nearly to the bottom of the tank to form guides for the cage.

The cage C, in which the animal to be dipped is confined, consists of a skeleton frame, having corner-strips $c$ and horizontal strips $c^2$, with vertical additional strips $c^3$ intermediate the corner-strips. The frame thus constructed is then provided with slats $c^4$, which are preferably vertically arranged for two-thirds the distance from the top of the cage downward and then slope at an angle—say sixty degrees—to the bottom of the cage, these sloping sides being indicated by $c^5$. The bottom of the cage is composed of slats $c^6$, running lengthwise. The object of this construction of the lower portion of the cage is twofold, first, the bottom of the cage meets with less resistance when lowered into the liquid of the tank, and, second, the animal is prevented from turning after once entering the cage. The cage is suspended in the frame by means of two hoisting-ropes D, attached to bails $c^7$, which are secured at each end of the cage upon the skeleton frame thereof. The hoist-ropes D are wound upon drums or spools $d$, fixed to a shaft $d^2$, mounted in bearings $d^3$ on the upper cross-strips $a^2$ of the frame A. This method of suspending the cage at two points, one at each end, is important, as it enables a positive hoisting pull to be exerted on the cage irrespective of the position of the animal within the cage—that is, if the animal enters the cage from one end his weight will occupy a different position from what it would if he entered from the other end, or if he moves forward or backward within the cage his weight will be differently disposed therein, and if the cage were suspended at a single point there would be considerable tendency of the cage to tip, and thus bind in the guides. By having the suspension from both ends this difficulty is overcome. The cage is raised and lowered by means of a cable or rope $d^4$, attached at one end to drum $d^5$, secured to one end of shaft $d^2$ and passing over a fixed pulley $d^6$ at the bottom of the frame A. The cage is open at both ends, preferably, and access thereto is controlled by gates E, slidingly mounted by means of rollers $e$, which travel upon rods $e^2$, fixed to the frame A.

The machine as thus constructed is very simple and durable, besides being rigid and strong, and may be built of materials obtainable in any hardware-store and lumber-yard, with the exception of the tank.

While I have described a specific construction in detail, it will be understood that I do not wish to limit myself strictly thereto, as various changes and modifications may be made without departing from the spirit of the invention, and these, I wish it to be understood, fall strictly within the scope thereof.

Having thus described my invention, what I claim as new, and desire to secure by Letters Patent of the United States, is—

1. In a dipping-machine, the combination with a tank and a suitable frame, of an openwork cage arranged in said frame, a hoist-shaft mounted upon the frame parallel with the longitudinal axis of the cage, a hoisting connection between said shaft and each end of the cage, and means for revolving the shaft, substantially as described.

2. In a dipping-machine, the combination with a tank and a suitable frame, of a cage arranged in said frame, a hoist-shaft mounted upon the frame parallel with the longitudinal axis of the cage, a flexible hoisting connection between said shaft and each end of the cage, and means for revolving the shaft, substantially as described.

3. In a dipping-machine, the combination with a tank and a suitable frame, of a cage arranged in said frame and having its sides near the bottom thereof inclined toward the center, and hoisting means for the cage, substantially as described.

4. In a dipping-machine, the combination with a tank and a suitable frame, of a cage arranged in said frame having a V-shaped lower portion to prevent an animal from turning within the cage, and hoisting means for the cage, substantially as described.

5. In a dipping-machine, the combination with a tank and a suitable frame, of a cage having a narrow bottom arranged in said frame, the sides of said cage having a lower portion which slopes outwardly and upwardly to a substantially vertical portion, as and for the purpose set forth.

6. In a dipping-machine, the combination with a tank and a suitable frame, of a cage arranged in said frame and having its sides near the bottom thereof inclined at substantially an angle of sixty degrees, and hoisting means for the cage, substantially as described.

7. In a dipping-machine, a sheet-metal tank designed to be set in the ground, and stay means attached to the sides thereof to resist earth-pressure, in combination with a frame, and a cage provided with hoisting means mounted in said frame, substantially as described.

8. A sheet-metal tank for dipping-machines designed to be set in the ground, and stay means attached to the sides of said tank to resist earth-pressure, substantially as described.

9. A tank for dipping-machines designed to be set in the ground and having a portion or portions yieldable to earth-pressure from without, in combination with stay means attached at said portion or portions to counteract said earth-pressure, substantially as described.

10. A sheet-metal tank for dipping-machines designed to be set in the ground and provided with bracing means intermediate the top and bottom, in combination with stay means attached to said bracing means to resist earth-pressure, substantially as described.

In testimony whereof I have hereunto set my hand, in the presence of two subscribing witnesses, this 25th day of May, A. D. 1904.

CHENIA A. NEWBERRY.

Witnesses:
H. K. SCHARS,
SANG C. RECK.